United States Patent [19]

Gregorian et al.

[11] 4,034,134

[45] July 5, 1977

[54] LAMINATES AND COATED SUBSTRATES

[75] Inventors: Razmic S. Gregorian, Aiken, S.C.; Hans R. Hoernle, Augusta, Ga.

[73] Assignee: United Merchants and Manufacturers, Inc., New York, N.Y.

[22] Filed: Oct. 7, 1975

[21] Appl. No.: 620,280

[52] U.S. Cl. .................. 428/86; 156/68; 156/72; 156/230; 156/237; 156/276; 156/279; 156/344; 427/146; 427/154; 427/156; 427/200; 427/203; 427/206; 427/331; 428/87; 428/90; 428/95; 428/96; 428/97; 428/119; 428/120; 428/198; 428/246; 428/253

[51] Int. Cl.² .................. B05D 1/14; B05D 1/16; B32B 33/00

[58] Field of Search .................. 428/86, 87, 90, 95, 428/96, 97, 198, 246, 253, 119, 120; 427/200, 206, 146, 154, 156, 203, 331; 156/68, 72, 230, 237, 276, 279, 344

[56] References Cited

UNITED STATES PATENTS

| | | | |
|---|---|---|---|
| 2,135,901 | 11/1938 | Lea | 428/90 |
| 2,752,277 | 6/1956 | Keen | 428/87 |
| 3,616,126 | 10/1971 | Tungseth | 428/86 |
| 3,684,637 | 8/1972 | Anderson | 428/90 |
| 3,837,946 | 9/1974 | Gribbin | 428/86 |

*Primary Examiner*—Marion E. McCamish
*Attorney, Agent, or Firm*—Michael A. Caputo; John P. McGann

[57] ABSTRACT

A process for producing a laminate by coating a continuous first layer of a film forming material onto a release sheet, distributing flock fibers uniformly onto the first layer, drying the first layer to form a film and secure the flock fibers thereto in a substantially upstanding position, coating the tips of the flock fibers with a flock adhesive, marrying the flocked film to a substrate backing layer such that the coated tips contact the said substrate layer, permanently setting the flock adhesive, and then removing the release sheet. Laminates obtained by such method are also described.

28 Claims, 2 Drawing Figures

LAMINATES AND COATED SUBSTRATES

BACKGROUND OF THE INVENTION

1. Field of the Invention

This invention pertains to the filed of laminates containing a flock or pile interlayer. More particularly, this invention pertains to textile laminates having backing substrates which are impractical or impossible to nap or flock.

2. Description of the Prior Art

Textile fabrics comprising laminates of raised fibers, such as, flock or pile, secured to a base or substrate material and having a facing layer thereon are well known.

Fabrics which are inherently porous or dimensionally unstable, e.g., knits or coursely woven materials, and the like, have heretofore not been used as the backing or substrate layer in the type of laminate mentioned above. Such fabrics, cannot effectively be flocked without also destroying the fabric and creating a very boardy hand.

Further, these fabrics do not lend themselves to napping as a substitute for flocking, for it is extremely difficult if not impossible, to nap such a fabric without also destroying it.

SUMMARY OF THE INVENTION

Applicant has discovered a new multi-component laminate comprising a continuous film facing layer and a substrate backing layer secured to the facing layer by a plurality of uniformly distributed, substantially upstanding flock fibers, one end of substantially all of the flock fibers being permanently embedded in the facing layer and the other end of substantially all of the flock fibers being secured to the substrate backing layer by a flock adhesive.

The substrate backing layer may be selected from a material which is normally difficult or impossible to flock or nap, e.g., knits or coursely woven fabrics, and the like.

Applicants have also found a method for producing such laminates by first coating a release sheet with a continuous first layer of a film forming material, distributing flock fibers uniformly onto the first layer, drying the first layer to form a film and secure the flock fibers thereto in a substantially upstanding position, coating the tips of the flock fibers with a flock adhesive, marrying the flocked film to a substrate backing layer such that the coated tips contact the substrate layer, permanently setting the flock adhesive, and then removing the release sheet.

DESCRIPTION OF THE PREFERRED EMBODIMENT

Figure 1:
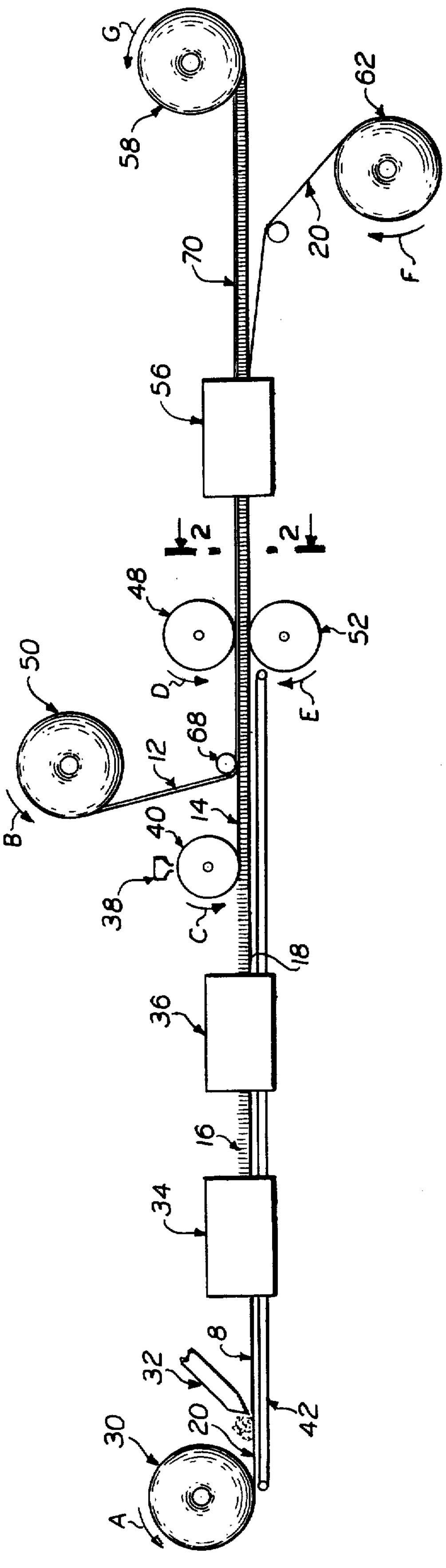
FIG. 1, is a schematic diagram of the process of the present invention.

Referring to FIG. 1, the process of the present invention may generally be carried out as follows:

A roll 30 of release sheel 20 is unwound in the direction indicated by arrow A and is carried by conveyor 42 sequentially under a distribution means 32, which applies and a continuous layer of a film forming material 8 to the release sheet; a flocking box 34, where flock 16 is applied to the film forming material 8; and a drying box 36, where the film forming material 8 is dried to permanently adhere the flock to the film forming material. The film forming material 8 also cured in drying box 36 to form a facing layer 18.

Upon leaving the drying box 36, the combination release sheet 20, facing layer 18, and flock 16 is carried under a kiss roll 40 which rotates in the direction shown by arrow C to lay down a thin coating of adhesive 14 from a trough 38. A substrate backing layer 12 fed from a roll 50, rotating in the direction shown by arrow B, is then brought into contact with the adhesive 14 by the action of positioning roll 68. A pair of squeeze rolls, 48, 52, driven in the direction indicated by arrows D and E, respectively, then marry the substrate backing layer 12 to the adhesive coated flock.

The adhesive is then cured in curing box 56, the release sheet 20 is stripped from the completed laminate 70 and wound in the direction indicated by arrow F on roll 62. The completed laminate 70 is simultaneously wound on roll 58 in the direction indicated by arrow G.

Referring now in greater detail to the process and components shown in FIG. 1, the release sheet 20 may be any conventional type of release sheet well known in the art. The only requirements necessary for this release sheet are that it must be resistant to any solvent contained in film forming material 8; that it be resistant to the heat necessary to dry the film forming material; and that it be strippable from the resulting facing layer 18 at the end of the entire process.

Suitable release sheets include fabrics, paper, metals, and the like, which can have their surfaces treated by methods well known in the art so that they posses the requisite properties mentioned hereinabove.

Generally, however, a paper release sheet is used which comprises an unbleached Kraft paper directly coated with a cured silicone, e.g., an organic polysiloxane. Such polysiloxanes are described in detail in U.S. Pat. No. 3,503,782, incorporated herein by reference.

If desired, the release sheet may be used as a means for imparting decorative effects to the facing layer.

Thus, it may be desirable to use a release sheet which contains a textured surface thereon in lieu of the usual smooth one . This makes it possible to impart to the film facing layer 18 the textured surface present on the release sheet. Such release sheets containing a textured surface thereon are well known in the art.

Additionally, it may also be possible to employ a release sheet, such that, when it is ultimately stripped from the facing layer 18, it leaves behind one or more of its components in the final laminate as an integral part thereof. Such a release sheet may be any one of the release sheets mentioned hereinabove with the exception that it possesses, on the surface thereof, particles of paper, fabric, fibers (flock), or glitter, or powders composed of talcum, cork, wood, pigment, or the like The particle containing release sheet is prepared by first coating the release sheet with a temporary flock binder which is well known in the art. Such a temporary binder may consist of starch, gum, or the like.

The use of temporary flock binder is generally desirable due to its limited adhesive characteristics such that the particles are held together very loosely.

The particles themselves are applied to the binder coated release sheet by any conventional method which is well within the skill of the ordinary art worker. Such methods may consist of spraying, flocking, dusting, or the like.

After the application of the particles, the release sheet with the particles thereon is dried.

Depending upon the viscosity of the film forming material which is subsequently applied to the release sheet, the particles may either be retained on the surface of the film facing layer 18 or be completely embedded therein.

Thus, at a viscosity of about 100,000 to 300,000 cps and perferably from about 150,000 to 200,000 cps the particles are retained on top of the film facing layer resulting in a suede-leather type product. On the other hand, when the viscosity of the film forming material is lowered to about 20,000 to 80,000 cps., and preferably from about 40,000 to 60,000 cps, the particles are actually embedded in the film facing layer resulting in leather-like laminate. The particles so embedded act as a filler, or a de-tackifier or alternatively, as a means to produce multi-component and/or multicolored facing layers.

It is also possible to sand the resulting facing layer to produce a suede-like surface by exposing part of the particles which are embedded in the facing layer or alternatively, by breaking or rupturing the surface cells of the film facing layer. The sanding is accomplished by means of a conventional sanding machine through which the finished laminate is passed.

Furthermore, in yet another embodiment of the present invention, it is possible when desired, to dye the film facing layer by means of the release sheet.

This is accomplished by applying the film forming material onto a release sheet comprising a conventional sublistatic transfer pring paper coated with a cured silicone. At the completion of the entire process, the transfer print paper is stripped from the final laminate resulting in the film facing layer possessing a multi-colored printed pattern.

Referring once again to FIG. 1, release sheet 20 is conveyed by conveyor 42 under a distribution means 32 whereby the film forming material 8 is applied to release sheet 20.

The type of distribution means used is not critical to the present invention, so long as it can effectively apply the deisred thickness of the film forming material 8 substantially over the entire top surface area of the release sheet. Typically, the distribution means may consist of a coating knife which is well known in the art. Alternatively, the distribution means may comprise a reverse roll coater, a spray gun, or the like. Generally, the distrubution means used will depend upon the physical nature of the film forming material, i.e., whether it is a paste, a solution, etc.

Suitable materials that may be used for the film forming material 8 include urethanes, vinyls, acrylics, nitriles, and the like. The film forming materials used can either be in the foamed or non-foamed state depending upon the desired end result.

Film forming material 8, which ultimately becomes facing layer 18 after having been dried, may be prepared from a solvent or aqueous system having a solids content in the range of about 10 to 100 percent by weight, and preferably from about 40 to 50 percent by weight.

It is generally desirable to include additives in the film forming material to produce or modify certain properties of the resulting film.

Examples of these additives include fluorocarbons, silicones such as dimethyl silicone, silicone carbonols, or the like. Generally, about 1 to 5 percent by weight is added to the film forming solution. These additives function as a detackifiers, water repellants, or as agents which impart surface slip.

When the film forming material 8 is being applied to the release sheet, it is preferably at a viscosity of about 10,000 to 300,000 cps depending upon the particular end product desired. Thus, for example, the release sheet, as mentioned hereinabove, may contain particles thereon which may or may not be embedded into the resulting film facing layer, depending upon the viscosity of the film forming material.

Additionally, since this film forming material is flocked in the very next step of the process, the viscosity of the material is also dictated by its ability to flow evenly onto the release sheet and, in addition, is dictated by its ability to securely hold flock fibers in an upstanding position.

The viscosities for the film forming material are measured by conventional methods which are well known in the art. Generally, the viscosities were measured by the Brookfield method at room temperature. Other methods of viscosity measurement are equally satisfactory.

It is generally desirable to apply a thickness of about 2–25 mils as a wet lay-down and preferably from about 10–15 mils at a solids content of about 50 percent by weight. Where the film forming material is a foam, then the lay-down thickness will be dictated by the blow ratio among other things. On the other hand, in the case of unfoamed film forming materials, the thickness is dictated and determined by the desired end result and ultimate application.

The release sheet coated with the film forming material 8 passes through flocking box 34. The flocking box may be any type conventionally used in the art, such as, the beater-bar type or an electrostatic flocking unit.

The flock 16 is applied directly onto the still wet and tacky film forming material 8. Thus, the film simultaneously functions as a facing layer and as a flock adhesive. The flock fibers are permanently embedded in the facing layer once it is dried.

The flock 16 is deposited so that it is oriented on the film forming material layer in a substantially upright position and in a uniform manner across the film layer. As mentioned, hereinabove, the viscosity of the layer is such as to enable the flock to be so oriented until the film forming material is thoroughly dried and cured to form facing layer 18.

Suitable materials for the use as flock fiber include rayon, cotton, nylon, polyesters, wool, mohair, silk, acrylics, modacrylics, natural and synthetic fibers, and the like. Such flock normally consists of fibers or filamentary material, generally less than about ½ millimeter, and up to about 5 millimeters in length.

When longer flock is used, e.g., 1 to 5 millimeters, the resulting fabric laminate possesses springy and resilient properties in addition to a facing layer surface having a leather-like character. As a result, this fabric laminate may be used for the manufacture of quilted leather-like substrates.

The release sheet, with the film forming material thereon, is conveyed through the flocking step at a speed generally within the range used in commercial flocking processes, e.g., 25 to 100 feet/minute.

After exiting flocking box 34, the flocked release sheet is conveyed to a drying box 36 which may be a conventional drier well known in the art. The film forming material 8 is dried therein, forming permanent film facing layer 18, by the removal of solvent and any other liquids contained therein. In addition, the film facing layer may also be cured in drying box 36 depending upon the type of material being used, e.g., a thermosetting plastic.

The drying is generally carried out at a temperature of about 220° to 340° F, and preferably at a temperature of about 250° to 320° F, at atmospheric pressure.

Drying the film forming material 8, thereby forming film facing layer 18, permanently secures the flock thereto by embedding the same making it an integral part of the film facing layer.

Thereafter, the release sheet 20, with the flocked facing layer 18 thereon, is conveyed past kiss roll 40 which is supplied with adhesive by trough 38. In this step, kiss roll 40 applies a thin coating of adhesive 14 to the very surface tips of the flock fibers 16.

Of course, other methods of adhesive application may also be used. Such methods include the use of knife coating, spraying, and the like. Generally, the type of adhesive application means used is dependent upon the solids content of the adhesive, and the amount of adhesive to be applied.

Any type of flock binder or adhesive may be used in the process. Such adhesives are well known in the art and are generally classified as water based and solvent based adhesives. Additionally, they may be foamed or non-foamed depending upon the desired end result.

Water based adhesives consist of a binder, generally an emulsion polymer and a viscosity builder. They may also contain placticizers, thermosetting resin, curing catalysts, stabilizers and other additives well known in the art.

The emulsion polymers generally used include acrylic, vinyl-acrylic, vinyl, neoprene, urethane, styrene-butadiene latexes, and the like.

The viscosity of the adhesive is such that the adhesive does not run down the length of the flocked fibers and onto the facing layer 18 during application. Furthermore, the fiscosity is such that there is some partial penetration and absorption into the fiber tips of flock 16. The viscosity measured at ambient temperature by the Brookfield method is usually in the range of about 80,000 to 300,000 cps and is preferably in the range of about 100,000 to 200,000 cps. in order to obtain the necessary viscosity characteristics in the adhesive.

Suitable thickeners include water soluble polymers, such as carboxymethyl cellulose, hydroxyethyl cellulose, poly-oxyethylenes, and natural gums as well as alkali swellable polymers, such as highly carboxylated acrylic emulsion polymers.

Plasticizers may be added to alter the hand of the finished goods or to improve the flow and leveling characteristics of the adhesives. With the primary goal as the latter, fugative plasticizers, such as, the phthalate esters may be employed. If the intent is to alter the hand of the finished goods then more permanent plasticizers, such as, low molecular weight polyesters may be used.

Thermosetting resins, such a methylol-melamines, urea formaldehyde condensates or phenol-formaldehyde condensates may be incorporated to improve the durability or abrasion resistance of the finished goods.

Catalysts, such a oxalic acid or di-ammonium phosphate can be used to increase the rate of cure of the adhesive.

Solvent adhesives include both fully reactive soluble polymers, such as, acrylic homo and co-polymers, polyesters, polyamides, or polyurethanes and two package systems such as polyester polyols with di-isocyanates or isocyanate prepolymers and epoxies with polyamides. The polymer and prepolymer is dissolved in a suitable solvent which is preferably low boiling, and then thickened to the proper viscosity in a manner similar to that used for the water based adhesives. Catalysts, cross-linking agents, stabilizers, pigments, or dyes may also be incorporated.

After the adhesive 14 has been applied, the partially completed laminate is conveyed to squeeze rolls 48 and 52, where it is married substrate backing layer 12.

Substrate backing layer 12 may be any type of substrate capable of being used in a textile laminate, such as, woven or non-woven fabrics, foamed or unfoamed plastics, paper and the like. Typically, suitable flexible substrates include polyvinyl and urethane films, fabrics composed of cellulose-based fabrics, e.g., rayon or cotton, and synthetic and natural fibers. In particular, however, in accordance with the present invention, fabric materials which are impossible or difficult to flock or nap are particularly applicable to being used as a substrate backing layer in the present invention.

Fabrics which are inherently porous or dimensionally unstable, e.g., knits or coursely woven materials, particularly so-called "sliver knit" fabrics, cannot effectively be flocked without also destroying the fabric or creating a very boardy hand. Further, these fabrics do not lend themselves to napping as a substitute for flocking for it is extremely difficult, if not impossible, to nap such a fabric without also destroying it. Thus, one of the important advantages of the present invention is the fact that such fabrics, which heretofore have not been used effectively in a substrate backing in a flocked laminate can now be so used.

The laminate is then conveyed to curing box 56 which may be of conventional design where the adhesive 14 is set or cured. This is usually accomplished by heating or subjecting the binder to ultra violet irridation for a period of time sufficient to fix the binder.

After existing the curing box 56, the release sheet 20 is separated and stripped from the completed laminate 70. As shown in FIG. 1, the release sheet 20 is rolled onto roll 62 for disposal or possible re-use, and the finished laminate is wound onto roll 58.

If desired, it is possible to separate the release sheet prior to the curing step. Whether the release sheet is removed before or after the curing step, is not critical to the present invention.

Figure 2:
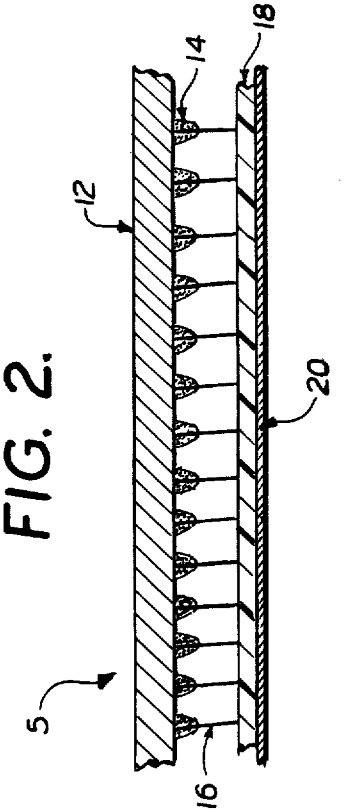
FIG. 2, is a pictorial cross-sectional representation of the laminate of the invention taken along 2—2 of FIG. 1 prior to removal of the release sheet from the laminate.

Referring now to FIG. 2, there is shown a pictorial representation of a cross-section of the laminate taken along line 2—2 of FIG. 1, i.e., after it has passed through squeeze rolls 48 and 52.

Thus, as shown in FIG. 2, the laminate represented generally as number 5, has a substrate backing layer 12 which may be of a kind which heretofore could not have been flocked, a flock interlayer 16, a film facing layer 18, and a strippable release sheet 20, wherein said flock is integrally affixed to said backing layer by flock adhesive 14, and is integrally affixed to said facing layer by means of the facing layer itself, which simultaneously acts as a decorative facing layer, and as an adhesive to bind flock 16.

From FIG. 2, it is seen that flock adhesive 14 is present only at the fiber tips of flock 16 and at the corresponding point of contact with substrate backing layer 12, where the flock is bound. This produces a discontinuous flock adhesive layer wherein substantially all of the flock adhesive is present only at the tips of flock fibers. This results in much better breathability (air permeability) of the laminate when compared to a laminate where the flock adhesive is applied uniformly and continuously over the entire surface area of the substrate backing.

Due to the discontinuous nature of the adhesive layer, the laminate not only has better breathability and porosity, but also, possesses a better aesthetic hand as a result thereof.

It is understood, of course, that the present invention can also be practiced by applying the flock adhesive in a substantially continuous layer over the flock fibers, resulting in a laminate which does not, however, possess the breathability, porosity, and aesthetic hand that is present when applying the adhesive only to the fiber tips of the flock.

The following examples further illustrate the present invention:

EXAMPLE 1

A conventional type of paper release sheet with a smooth surface was coated with a pigmented aqueous acrylic binder possessing a viscosity of 85,000 cps and solids of 45% to a wet lay-down of 15 mils. The coated paper was flocked on a beater bar unit with 1½ mm rayon flock.

The flocked paper was dried at 60° C. for 30 minutes. The flock surface was then coated with a conventional acrylic latex type of flock binder having a viscosity of approximately 130,000 cps to a wet lay-down of 15 mils. Cotton flannel then was laminated to the coated flock surface with the non-napped side facing the binder layer. The laminate was dried at 60° C. for 30 minutes and cured at 150° C. for 10 minutes. Finally, the release paper was stripped.

The final product possessed a smooth leather-like facing layer, a fiberous, air-entrapping interlayer and a napped fabric surface as a backing layer. Upon multidirectional bending the film surface developed a fine leather-like grain.

EXAMPLE 2

Example 1 was repeated, but instead of a smooth release sheet, a textured release paper was used.

The resulting laminate possessed a leather-like textured surface.

EXAMPLE 3

A cotton fabric was coated with a cellulosic gum to a wet lay-down of 3 mils. The gum film was flocked with ground cotton. The flocked substrate was completely dried.

The "temporary" flocked fabric was coated with an aqueous acrylic binder possessing a viscosity of 100,000 cps followed by flocking with 1½ mm nylon flock. After drying, the flock surface was coated and a fabric was laminated onto the binder exactly as outlined in Example 1. The auxiliary cotton fabric was stripped leaving the ground cotton firmly attached to the acrylic film.

The resulting laminate possessed a suede-like feel on the facing layer.

EXAMPLE 4

Commercial transfer print paper was sprayed with a commercial mold release type of silicone to a very thin film.

The sprayed paper was coated with a clear acrylic comprising 2% dimethyl silicone and having a viscosity of 80,000 cps to a wet lay-down of 12 mils. The wet film was flocked with a 2 mm acrylic flock on a beater bar unit.

The flocked film disposed on the paper was dried at 100° C. for 15 minutes. The flock surface then was coated with an acrylic flock binder having a viscosity of 150,000 cps to a wet lay-down of 20 mils. A woven 50/50 polyester-cotton fabric was laminated onto the binder coated flock. The laminate was dried at 100° C. for 15 minutes and cured at 150° C. for 15 minutes.

The laminate still attached to the transfer paper was transfer printed at 420° F. and at a content time of 20 seconds. Finally the paper was stripped.

The laminate possessed a leather-like facing layer and a multi-color print pattern on its surface.

EXAMPLE 5

Example 1 was repeated, except, after the second coating a polyester knit was laminated to the binder coated flock.

EXAMPLE 6

Example 1 was repeated, except, after the second coating, a nylon tricot was laminated to the binder coated flock.

EXAMPLE 7

Example 1 was repeated, except, after the second coating, a non-woven polyester substrate was laminated to the binder coated flock.

EXAMPLE 8

Example 1 was repeated, except, after the second coating, a flocked fabric was laminated to the binder coated flock.

EXAMPLE 9

A conventional type of release paper having a smooth surface was coated with a pigmented aqueous urethane binder possessing a viscosity of 30,000 cps and solids content of 40% to a wet lay-down of 10 mils. The coated paper was flocked on a beater bar unit with 1½ mm rayon flock.

The flocked paper was dried at 60° C. for 30 minutes. The flock surface then was coated with a conventional acrylic type of flock binder having a viscosity of 180,000 cps to a wet lay-down of 15 mil. A sliver knit then was laminated to the coated flock surface. The laminate was dried at 60° C. for 30 minutes and cured at 150° C. for 10 minutes. Finally, the release paper was stripped.

The product possessed a smooth leather-like facing layer, a fiberous, air-entrapping interlayer and a knitted backing layer.

EXAMPLE 10

A urethane latex was foamed on a Hobart foamer to a blow ratio of 2:1. The viscosity of the foam was 40,000 cps. A textured release paper was coated with the foam to a wet lay-down of 20 mils. The coated paper was flocked with 1½ mm rayon flock.

The flocked paper was dried at 100° C. for 10 minutes. The flock surface then was coated with the same urethane foamed to a 4:1 blow ratio to a wet lay-down of 30 mil. A cotton fabric then was laminated to the coated flock surface. The laminate was dried at 100° C. for 20 minutes and cured at 160° C. for 10 minutes. Finally, the release paper was stripped.

The laminate was breathable and possessed a textured leather-like facing layer, a fiberous interlayer and a fabric-like backing.

EXAMPLE 11

Example 1 was repeated, except, a vinyl plastisol was used for the coating on the release paper.

EXAMPLE 12

Example 1 was repeated, except, a 3 mm nylon flock was used.

EXAMPLE 13

Example 1 was repeated, except, a 2 mm acrylic flock was used.

EXAMPLE 14

An acrylic latex and a nitrile latex, were blended in a 1:3 ratio. To this were added 2% dimethyl silicone and 5% wood flower. The total blend was foamed with ammonium stearate to a 3:1 blow ratio. The foam was coated onto release paper possessing a smooth surface to a wet lay-down of 40 mils. The coated paper was flocked with 1½ mm rayon flock and dried at 100° C. for 10 minutes. The flock surface was coated with a standard flock binder having a viscosity of 140,000 cps to a wet lay-down of 15 mils. A knit fabric then was laminated to the binder coated flock. The laminate was dried at 100° C. for 15 minutes and cured at 150° C. for 20 minutes. The release paper was stripped and the facing side was sanded with a medium grit carborundum emory cloth.

The resulting laminate possessed a suede-like facing layer. The laminate was elastic and resilient.

Variations and modifications may, of course, be made, without departing from the spirit and scope of the present invention.

Having thus described our invention, what we claim and desire to secure by Letters Patent is:

1. A laminate comprising:

a. an air permeable film facing layer; and b. a substrate backing layer secured to the facing layer by a plurality of uniformly distributed, substantially upstanding flock fibers, one end of substantially all of the flock fibers being permanently embedded in the facing layer and the other end of substantially all of the flock fibers being secured to the substrate backing layer by a discontinuous layer of a flock adhesive and wherein substantially all of the flock adhesive is present at the tips of the flock fibers which are secured to the substrate backing layer, thereby imparting air permeability to the laminate.

2. The laminate of claim 1 wherein the facing layer is decorative.

3. The laminate of claim 2 wherein the facing layer has particulate material substantially embedded in its outer exposed surface.

4. The laminate of claim 2 wherein the facing layer has particulate material on the outer, exposed surface thereof.

5. The laminate of claim 1 wherein the facing layer is a flexible film of a material selected from the group consisting of urethanes, vinyls, nitriles and acrylics.

6. The laminate of claim 1 wherein the flock fibers are composed of materials selected from the group consisting of rayon, cotton, nylon, polyester, wool, mohair, silk, acrylic, modacrylic, natural and synthetic fibers, and blends thereof.

7. The laminate of claim 1 wherein the flock adhesive is selected from the group consisting of urethane, vinyl, neoprene, acrylic, vinyl-acrylic, and styrene-butadiene latexes.

8. The laminate of claim 1 wherein the substrate backing layer is a woven, knitted, or non-woven fabric.

9. The laminate of claim 1 wherein the substrate backing layer is a sliver knit fabric.

10. The laminate of claim 1 wherein the substrate backing material is selected from the group consisting of natural and synthetic fibers.

11. An air permeable laminate comprising:

a. a continuous film facing layer; and b. a substrate backing layer secured to the facing layer by a plurality of uniformly distributed, substantially upstanding flock fibers, one end of substantially all of the flock fibers being permanently embedded in the facing layer, and the other end of substantially all of the flock fibers being secured to the substrate backing layer by a flock adhesive wherein substantially all of the flock adhesive is present at the tips of the flock fibers.

12. A process for producing a laminate comprising:

a. coating a release sheet with a continuous first layer of a film forming material;

b. distributing flock fibers uniformly onto the first layer;

c. drying the first layer to form a film and securing the flock fibers thereto in a substantially upstanding position;

d. coating the tips of the flock fibers with a flock adhesive;

e. marrying the flocked fibers to a substrate backing layer such that the coated tips contact the substrate layer;

f. permanently setting the flock adhesive; and g. removing the release sheet.

13. The process of claim 12 wherein the film forming material is selected from the group consisting of urethanes, vinyls, nitriles and acrylics.

14. The process of claim 12 wherein the release sheet possesses a smooth surface.

15. The process of claim 12 wherein the release sheet possesses a textured surface.

16. The process of claim 12 wherein the release sheet possesses particulate material on the surface thereof and wherein the particulate material is substantially embedded into the first layer in step (a) as a result of the viscosity of the film forming material.

17. The process of claim 16 wherein the viscosity of the film forming material is from about 20,000 to about 80,000 cps.

18. The process of claim 12 wherein the release sheet possesses particulate material on the surface thereof and wherein the particulate material is retained on the surface of the first layer during step (a) as a result of the viscosity of the film forming material.

19. The process of claim 18 wherein the viscosity of the film forming material is from about 100,000 to about 300,000 cps.

20. The process of claim 12 wherein the first layer is decorative.

21. The process of claim 12 wherein the flock fibers have a length of from about ½ to about 5 millimeters.

22. The process of claim 12 wherein the flock fibers are composed of material selected from the group consisting of nylon, cotton, rayon, polyesters, wool, mohair, silk, acrylics, modacrylics, natural and synthetic fibers, and blends thereof.

23. The process of claim 12 wherein the flock adhesive is selected from the group consisting of urethane, vinyl, neoprene, acrylics, vinyl-acrylic, and styrene-butadiene latexes.

24. The process of claim 12 wherein the substrate backing layer is a woven, knitted, or non-woven fabric.

25. The process of claim 12 wherein the substrate is selected from the group consisting of natural and synthetic fibers.

26. A process for producing a breathable laminate comprising:

a. coating a release sheet with an air permeable continuous first layer of a film forming material;
b. distributing flock fibers uniformly onto the first layer;
c. drying the first layer to form a film and securing the flock fibers thereto in a substantially upstanding position;
d. coating only the tips of the flock fibers with a flock adhesive;
e. marrying the flocked fibers to a substrate backing layer such that the coated tips contact the substrate layer;
f. permanently setting the flock adhesive; and
g. removing the release sheet.

27. The process of claim 26 wherein the air permeable continuous first layer is a foam.

28. The process of claim 26 wherein the flock adhesive is a foam.

* * * * *